Figure 1:
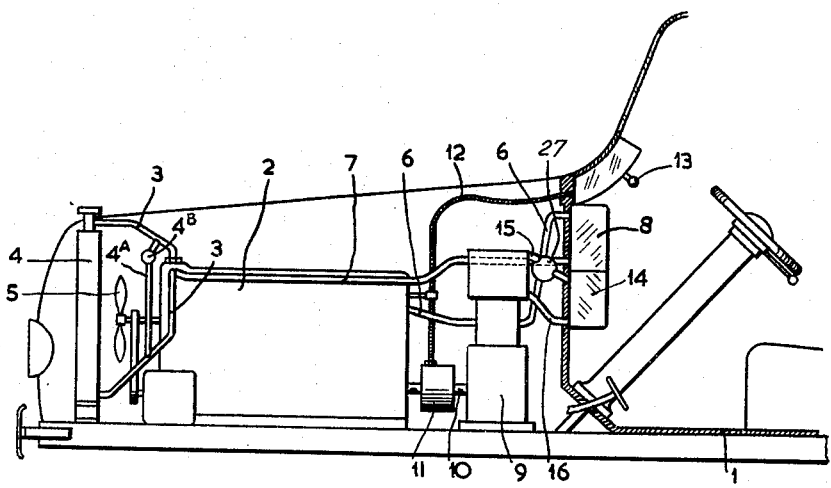

Oct. 11, 1960  H. RINIA  2,955,433
COMBINATION HEATING AND COOLING SYSTEM
Filed Jan. 24, 1957  2 Sheets-Sheet 1

INVENTOR
HERRE RINIA

BY
AGENT

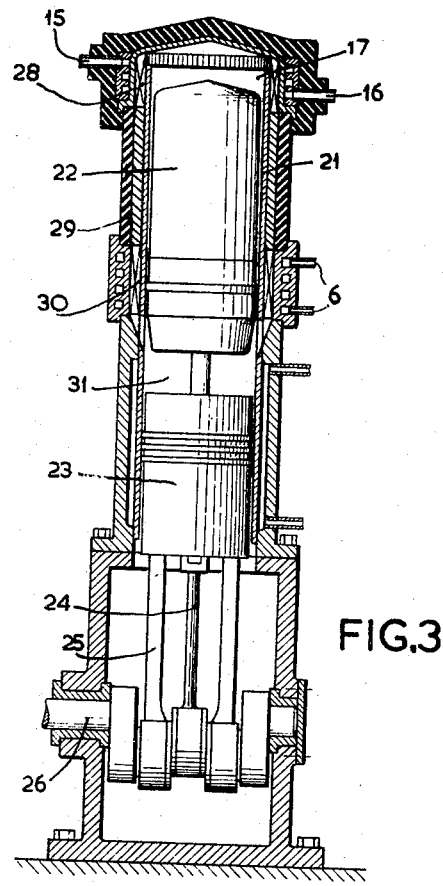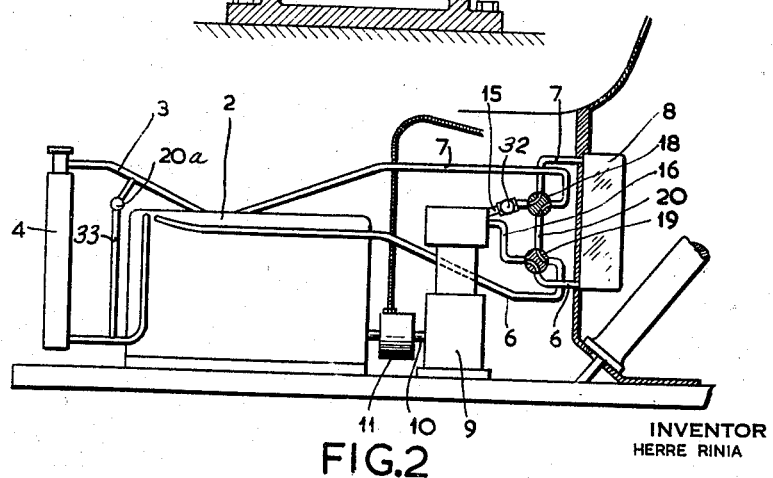

United States Patent Office 2,955,433
Patented Oct. 11, 1960

2,955,433
COMBINATION HEATING AND COOLING SYSTEM

Herre Rinia, Eindhoven, Netherlands, assignor, by mesne assignments, to North American Philips Company, Inc., New York, N.Y., a corporation of Delaware Filed Jan. 24, 1957, Ser. No. 636,202

Claims priority, application Netherlands Jan. 28, 1956

2 Claims. (Cl. 62—6)

This invention relates to a combination heating and cooling system for transportation means such as automotive vehicles, aircraft and ships.

Vehicles and the like are presently heated by installations such as cooling water of the engine, electric heating devices and devices utilizing engine exhaust gases. If air-conditioning is desired a separate installation, for example a compression expansion machine is necessary. The use of two separate installations for heating and cooling takes up additional valuable space in an automobile as well as considerably increasing the weight of the vehicle.

An object of the present invention is to overcome the aforesaid disadvantage of known devices for heating and cooling by providing a single apparatus which acts as a heat pump or a refrigerator.

Another object of the present invention is to provide a compact unit which utilizes a minimum of space.

A further object of the present invention is to provide a device which supplies a considerable quantity of thermal energy in a short time.

Another object of the present invention is to provide a combination heating and cooling device which is driven from the engine of an automobile, ship or aircraft.

In one form of the invention the present device is coupled through a reversing gear to the engine driving the device.

The above and other features, objects and advantages of the present invention will be fully understood from the following description considered in connection with the accompanying illustrative drawings.

Fig. 1 is a diagrammatic illustration of the apparatus constructed in accordance with the present invention, Fig. 2 is a diagrammatic illustration of the apparatus constructed in accordance with the present invention and connected to an existing heat exchanger, Fig. 3 is a view partly in section and partly in elevation of a thermodynamic reciprocating apparatus.

Referring to the drawings and especially to Fig. 1 wherein is shown an automobile frame 1 havinga an engine 2 mounted thereon. The engine comprises the usual cooling circuit 3 having a radiator 4 and a fan 5. The cooling system is connected in the usual manner through conduits 6 and 7 to the heater 8 of the automobile. The cooling system also comprises a cooler (not shown) of a thermo-dynamic reciprocating apparatus 9. The thermo-dynamic reciprocating apparatus 9 is driven through a shaft 10 and a coupling 11 from the auto engine 2. The coupling 11 is of the conventional type permitting the thermo-dynamic reciprocating apparatus 9 to be driven in either direction, or be disconnected. The coupling 11 may be operated by the driver, for example by means of a Bowden wire 12 connected to an operating knob 13. Circulation of the cooling means is achieved by means of a pump (not shown). Between the conduit 3 is a short-circuiting length of pipe referred to by the numeral 4a which may be opened or closed by valve 4b. The valve is controlled by means of a thermostat (not shown) in the cooling water conduit.

The present installation also comprises another heat exchanger 14 under the dashboard of the automobile and which is connected through conduits 15 and 16 to the other heat exchanger of the thermo-dynamic reciprocating apparatus 9. Conduit 15 includes a pump 27 which circulates liquid between the heat exchanger 14 and the thermo-dynamic reciprocating apparatus. The pump is driven from engine 2 or apparatus 9 as desired.

It is well known that when automobiles are parked for a period of time in cold weather a considerable time may elapse before the cooling water and the heater 8 reach the desired temperature to heat the interior of the automobile. In order to overcome this disadvantage, the thermo-dynamic reciprocating apparatus 9 is started up and operated as a heat pump. Thus, thermal energy is supplied by the apparatus 9 to the liquid in the conduits 6. Thermal energy is delivered to the heat exchanger 28 shown in Fig. 3 and thermal energy extracted from the cooling liquid in cooling circuits 6 and 7 through the heat exchanger 30. Since the refrigerator supplies cold to the cooling water, part of the cooling water is pumped through short-circuiting pipe 4a thereby the cold from the system will not materially affect the radiator 4. Thus, after a short period of time the heat exchanger 14 will give off thermal energy thereby rapidly heating the interior of the automobile. If the automobile is driven for a while and the cooling medium reaches the desired temperature the knob 13 may be operated to disconnect the apparatus and the cooling circuit heats the interior of the automobile in the usual manner.

If, in summer, the interior of the automobile is to be cooled, the knob 13 permits the coupling to be adjusted so that the engine 2 drives the thermo-dynamic reciprocating apparatus in a sense opposite to that when operating the apparatus as a heat pump. In this case, the apparatus operates as a refrigerator and thermal energy can be extracted from the heat-exchanger 28 (Fig. 3) and consequently from the liquid in the conduits 15 and 16, hence the heat-exchanger 14 will also reach the desired low temperature. Through the heat-exchanger 30 (Fig. 3) thermal energy is carried off to the cooling system of the engine. In this case the heater 8 has naturally been put out of action in known manner.

In the system shown in Fig. 2, parts corresponding to those shown in Fig. 1 are provided with the same reference numerals. In this case, there is only a heat exchanger 8 which is connected through conduits 6 and 7 to the cooling system of the engine. The conduits 6 and 7 contain four-way valves 18 and 19 through which the conduits 15, and 16 are connected to the thermal-dynamic reciprocating apparatus, and a short-circuiting duct 20 may also be connected in the system. In the position of the valves 18, 19 as shown in the drawing, the liquid is pumped through the pump 32 in the conduit 15 through the heat-exchanger 28 of the thermo-dynamic reciprocating apparatus and through the pump 32 to the heat exchanger 8. When operating the thermo-dynamic reciprocating apparatus as a heat pump through the coupling 11, thermal energy will be supplied to the heat exchanger. In the opposite sense of rotation, the apparatus operates as a refrigerator and thermal energy is withdrawn from the heat exchanger 8. In either case, the cooling medium flows from the engine through the heat exchanger of the thermo-dynamic reciprocating apparatus and the short-circuiting duct 33 provided with a valve 20a. If the heat exchanger 8 is to be heated by means of the cooling water of the engine, the thermo-dynamic reciprocating apparatus may be disconnected in the aforesaid manner and, by turning the valves 18, 19 through 90°, the cooling circuit of the engine from the radiator 4 is connected through the conduits 6 to the heat exchanger 8.

Naturally, the thermo-dynamic reciprocating apparatus may alternatively be driven from a separate engine independent of the main engine.

Fig. 3 shows on a different scale a thermo-dynamic reciprocating apparatus. The apparatus is the so-called displacer type and comprises a cylinder 21, in which a displacer 22 and a piston 23 reciprocate with a substantially constant phase difference. For this purpose, they are coupled through connecting rods 24, and 25 respectively to cranks of a crankshaft 26.

The space 17 above the displacer communicates through a first heat exchanger 28, a regenerator 29 and a second heat-exchanger 30 with a space 31 located between the piston and the displacer. As a result of a phase difference between the movements of the piston and the displacer, a gaseous medium present in the apparatus performs a closed thermo-dynamic cycle and in accordance with whether the displacer 22 leads or lags with respect to the piston 23, the apparatus operates as a refrigerator, or as a heat-pump. If the apparatus operates as a refrigerator, thermal energy is extracted via the heat-exchanger 28 from the liquid in contact with the heat exchanger, whereas thermal energy is supplied to it, if the apparatus operates as a heat-pump.

In the drawing, the thermo-dynamic apparatus is driven from the engine 2. As an alternative, the apparatus may comprise an engine of its own. Instead of using water, the refrigerator may be cooled by means of air.

Variation of the operation of the refrigerator may alternatively be affected by changing the phase difference between the piston and the displacer, as described in French patent specification 903,016.

While I have shown and described the preferred embodiment of my invention, it will be understood that the latter may be embodied otherwise than as herein specifically illustrated or described and that in the illustrated embodiment certain changes in the details of construction and in the arrangement of parts may be made without departing from the underlying idea or principle of the invention within the scope of the appended claims.

What is claimed is:

1. A combination heat-pump and cooling device including a circulating liquid for transportation means such as automobiles, aircraft, ships and the like comprising at least one external heat exchanger, a thermo-dynamic reciprocating apparatus provided with at least two chambers, means for changing the volume capacities of said chambers harmonically with a relative constant phase difference, a first heat exchanger, a regenerator and second heat exchanger in said apparatus, said chambers being in open communication with each other through said first heat exchanger, regenerator and second heat exchanger, a gaseous medium in said apparatus being invariably in the same state of aggregation and performing a closed thermo-dynamic cycle therein, an installation including conduits connecting said apparatus to said external heat exchanger, a pump in one of said conduits for circulating said liquid between said external heat exchanger and said thermo-dynamic reciprocating apparatus, a motor for driving said thermo-dynamic reciprocating apparatus, a reversible coupling connecting said motor and thermo-dynamic reciprocating apparatus, and remote means controlling the operation of said reversible coupling whereby the operation of the apparatus is reversed and thermal energy is conducted to said external heat exchanger when said apparatus is operated as a heat pump and cold is conducted to said external heat exchanger when said apparatus is operated as a cooling device.

2. A combination heat pump and cooling system including a circulating liquid for transportation means such as automobiles, aircraft, ships and the like comprising a single external heat exchanger, a thermo-dynamic reciprocating apparatus provided with at least two chambers, means for changing the volume capacities of said chambers harmonically with a relative constant phase difference, a first heat exchanger, a regenerator and a second heat exchanger in said apparatus, said chambers being in open communication with each other through said first heat exchanger, regenerator and second heat exchanger, a gaseous medium in said apparatus performing a closed thermo-dynamic cycle therein, an installation including conduits connecting said apparatus to said external heat exchanger, a pump in one of said conduits for circulating said liquid between said external heat exchanger and said thermo-dynamic reciprocating apparatus, a motor for driving said thermo-dynamic reciprocating apparatus, a reversible coupling connecting said motor and thermo-dynamic reciprocating apparatus, valve means connected to said external heat exchanger for selectively changing said single external heat exchanger from a cooling device to a heat pump and vice versa, remote means controlling said reversible coupling whereby the operation of the apparatus is reversed and thermal energy is conducted to said external heat exchanger when said apparatus is operated as a heat pump and cold is conducted to said external heat exchanger when said apparatus is operated as a cooling device.

References Cited in the file of this patent

UNITED STATES PATENTS

| | | |
|---|---|---|
| 1,508,522 | Lundgaard | Sept. 16, 1924 |
| 2,246,999 | Morrison | June 24, 1941 |
| 2,342,174 | Wolfert | Feb. 22, 1944 |
| 2,342,566 | Wolfert | Feb. 22, 1944 |
| 2,480,306 | Sanchis | Aug. 30, 1949 |
| 2,745,262 | Kohler | May 15, 1956 |
| 2,764,879 | De Lange | Oct. 2, 1956 |
| 2,787,129 | Evans | Apr. 2, 1957 |